United States Patent [19]

Stauch

[11] Patent Number: 4,721,047
[45] Date of Patent: Jan. 26, 1988

[54] APPARATUS FOR PLANTING SEED AND FERTILIZER

[76] Inventor: Aimee J. Stauch, Box 369, Esterhazy, Saskatchewan, Canada, S0A 0X0

[21] Appl. No.: 831,554

[22] Filed: Feb. 21, 1986

[30] Foreign Application Priority Data

Mar. 28, 1985 [CA] Canada .................. 477780

[51] Int. Cl.$^4$ ............................................. A01C 5/00
[52] U.S. Cl. ............................................. 111/73; 111/86
[58] Field of Search ................ 111/73, 80, 85, 86, 111/52.7; 172/724, 730

[56] References Cited

U.S. PATENT DOCUMENTS

| 399,217 | 3/1889 | Stewart | 172/724 |
|---|---|---|---|
| 776,506 | 12/1904 | Faught | 172/724 |
| 1,006,771 | 10/1911 | Metzler | 111/80 |
| 1,837,895 | 12/1931 | Chambers | 111/73 |
| 1,951,003 | 3/1934 | White | 111/73 |
| 2,058,539 | 10/1936 | Welty et al. | 111/73 |
| 2,164,066 | 6/1939 | Halle | 111/73 |
| 2,390,447 | 12/1945 | Miller | 172/724 |
| 2,515,368 | 7/1950 | Brunner | 111/73 |
| 2,713,836 | 7/1955 | Ajero | 111/80 |
| 2,764,111 | 9/1956 | Collins | 111/70 |
| 2,808,792 | 10/1957 | Brickman | 111/80 |
| 2,889,788 | 6/1959 | Van Dorn | 111/80 |
| 2,905,117 | 9/1959 | Dugan | 111/7 |
| 2,924,189 | 2/1960 | McLeod | 111/80 |
| 3,517,752 | 3/1970 | Glee | 111/86 |
| 4,417,530 | 11/1983 | Haybuster | 111/73 |

FOREIGN PATENT DOCUMENTS

| 119027 | 10/1944 | Australia | 111/86 |
|---|---|---|---|
| 163552 | 6/1915 | Canada . | |
| 638550 | 3/1962 | Canada . | |
| 840146 | 4/1970 | Canada | 111/30 |
| 1080554 | 7/1980 | Canada | 111/29 |
| 1082531 | 7/1980 | Canada | 111/34 |
| 1136916 | 12/1982 | Canada | 97/76 |
| 1143208 | 3/1983 | Canada | 97/76 |
| 1174907 | 9/1984 | Canada | 97/76 |
| 1178850 | 12/1984 | Canada | 111/19 |
| 1178851 | 12/1984 | Canada | 111/19 |
| 2177135 | 10/1971 | Fed. Rep. of Germany | 111/80 |
| 2074432 | 11/1981 | United Kingdom | 111/7 |
| 791281 | 1/1980 | U.S.S.R. | 111/84 |

OTHER PUBLICATIONS

Advertisement of a competitor named Willcar Industries, Ltd., publication date unknown.
Article in Grainews Newspaper dated Mar. 31, 1984 describing a competitor's device.

Primary Examiner—James R. Feyrer

[57] ABSTRACT

Apparatus for the combined planting of seed and application of fertilizer. The apparatus has a soil point for cutting a narrow slot-like furrow in soil. A shovel for opening a second, wider opening in the soil is located above and behind the soil point in alignment therewith. These two furrow cutting devices co-operate to form a single furrow having a narrow bottom part and a wider top part. An upright plate-like shoe member having a width similar to that of the narrow bottom part of the furrow is located immediately behind the soil point and prevents soil from falling into the narrow part of the furrow. A seed delivery tube is located immediately behind the shovel above the shoe member between the forward and rearward ends of the shoe member. A fertilizer delivery tube is located immediately behind the rearward end of the shoe member. The apparatus forms the narrow slot for the fertilizer and the wider slot for the seed before either seed or fertilizer is dropped into the soil, but the fertilizer slot is temporarily covered to prevent seed and soil from falling therein.

9 Claims, 10 Drawing Figures

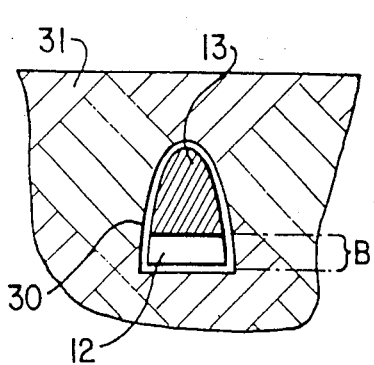
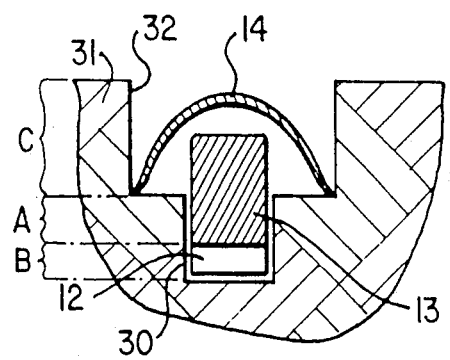
FIG. 3          FIG. 4
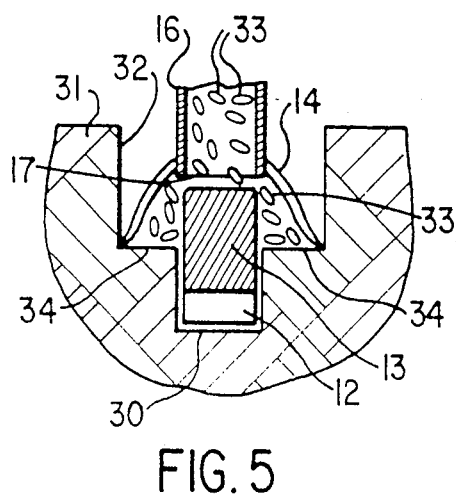
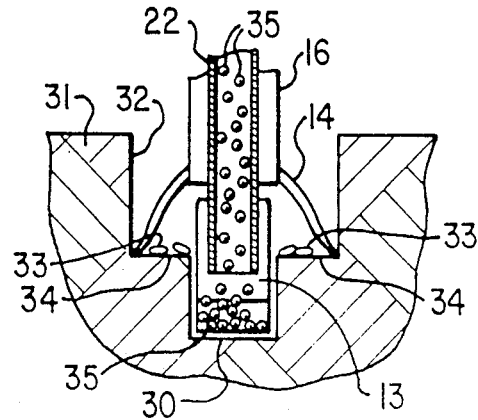
FIG. 5          FIG. 6
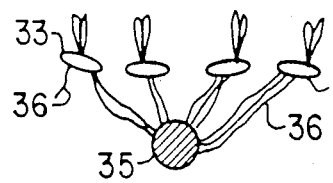
FIG. 7

APPARATUS FOR PLANTING SEED AND FERTILIZER

BACKGROUND OF THE INVENTION

I. Field of the Invention

This invention relates to apparatus for the combined planting of seed and application of fertilizer.

II. Description of the Prior Art

It is well known that seed, e.g. for cereals or other crops, fares much better if an appropriate amount of fertilizer is buried in the soil when the seed is being planted. It is also known that the fertilizer should not be in contact with the seed, since it may then "burn" and destroy the seed, but should be separated from the seed by a thin soil layer and should advantageously be located beneath the seed where it will be contacted by the roots when the seed begins to sprout.

Many devices have been proposed in the past for simultaneously burying seed and fertilizer, but many of these do not locate the fertilizer below the seed, or are complex and expensive or readily become blocked when operated in damp ground. In the case of the known devices which locate the seed below the fertilizer, the main disadvantage seems to be that the digging of a furrow for the seed disturbs the furrow previously produced for the fertilizer, or vice versa, so a satisfactory and reliable result cannot be obtained, particularly in difficult soil conditions.

There is thus a need for simple and reliable apparatus of the above-mentioned kind which is capable of locating the fertilizer at a suitable distance below the seed and which can preferably be manufactured as an attachment for conventional seed drills.

SUMMARY OF THE INVENTION

According to one aspect of the invention there is provided an apparatus for the combined planting of seed and application of fertilizer, which comprises: first furrow opening means for opening a narrow slot-like furrow in soil; second furrow opening means located behind and above said first means in alignment therewith, said second means opening a furrow that is wider than said narrow slotlike furrow and is superimposed thereon to form a single combined furrow having a narrow bottom portion and a wider top portion; a narrow upright plate-like shoe member, having forward and rearward ends, located immediately behind said first means to prevent soil from falling back into said narrow slot-like furrow; a seed delivery tube having an outlet located behind said second means and above said shoe member between said forward and rearward ends; and a fertilizer delivery tube having an outlet located immediately behind said rearward end of said shoe member in alignment with said narrow portion of the combined furrow.

According to another aspect of the invention there is provided an attachment for a seed drill having furrow opening means and a seed delivery tube having an outlet behind said furrow opening means; said attachment comprising an additional furrow opening means of narrower width than said furrow opening means of the seed drill for opening a narrow slot-like opening in soil; a narrow upright plate-like shoe member, having forward and rearward ends, located immediately behind said additional furrow opening means; a fertilizer delivery tube having an outlet located immediately behind the rearward end of the shoe member; and attachment means for attaching said attachment to said seed drill such that said additional furrow opening means is located forward of, below and in alignment with said furrow opening means of the seed drill, and said shoe member is located below the outlet of the seed delivery tube with said outlet located between the forward and rearward ends of the shoe member.

It should be noted that terms used herein such as "behind", "forward" and "rearward" are to be interpreted with reference to the normal direction of motion of the apparatus through the soil.

DESCRIPTION OF THE DRAWINGS

FIGS. 3 to 7 are cross-sections of a soil layer indicating the various operations as the apparatus of FIGS. 1 and 2 passes therethrough;

DETAILED DESCRIPTION OF PREFERRED EMBODIMENTS

Figure 1:
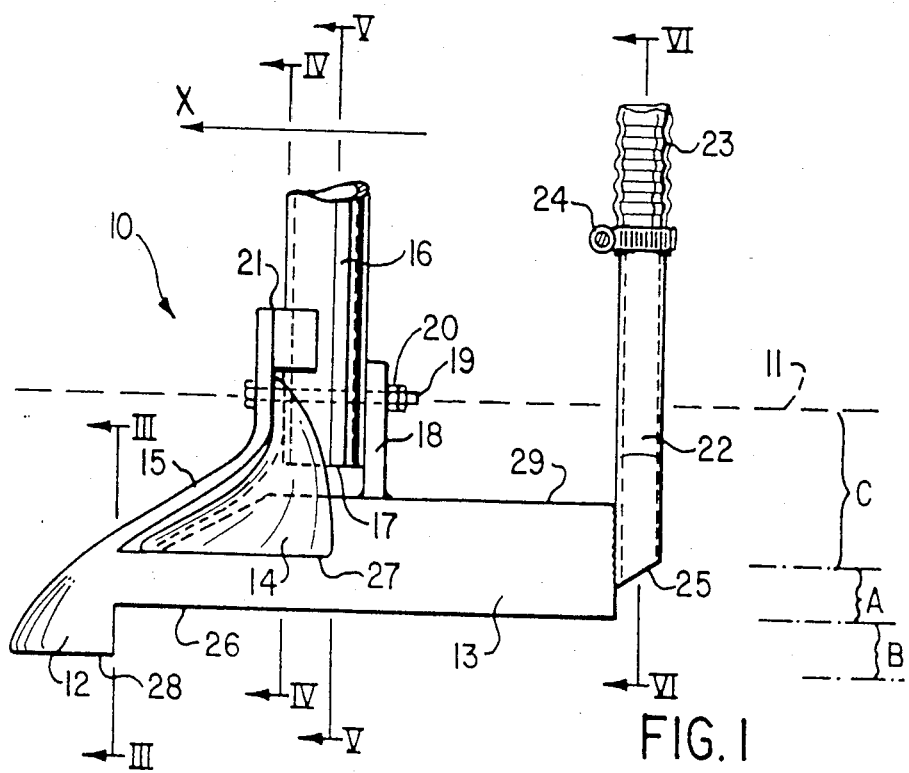
FIG. 1 is a side elevation of an apparatus according to one embodiment of the invention.

A preferred embodiment of the apparatus is indicated generally by reference numeral 10 and is moved by a suitable vehicle (not shown in FIGS. 1 and 2, but see FIG. 10) in the direction of the arrow "X" of FIG. 1.

Most of the apparatus is buried during use below the soil surface indicated by the broken line 11 of FIG. 1 so that, as the apparatus is moved, it cuts a furrow through the soil.

The first part of the apparatus which encounters unbroken ground is the wedge-shaped soil point 12. This is quite a narrow element (see FIG. 2) which is located below the other parts of the apparatus. The soil point acts as a first furrow opening means which forms a narrow slot-like opening in the soil with very little soil displacement.

Immediately behind and slightly above the soil point 12 is a narrow upright plate-like shoe member 13. The width of the shoe member corresponds to that of the soil point 12 so that it at least partially fills the newly-opened furrow formed by the soil point and prevents soil from falling back into the furrow.

A second furrow opening means is formed by a shovel 14 located at the forward end of the shoe member 13. The shovel is located at a level higher than the soil point 12 and is of significantly greater width (see FIG. 2). However, the soil point 12 and shovel 14 are in vertical alignment so that the furrow formed by the shovel is superimposed on the furrow formed by the soil point. The consequence of this is that the apparatus cuts a single furrow having a narrow bottom and a wide top.

Since, the shovel 14 encounters soil already partially broken by the soil point 12 and a connecting piece 15, it is able to produce a relatively wide furrow with comparative ease. The shape of the shovel is such that soil is lifted and turned to each side in the conventional manner. Since, the soil point 12 encounters unbroken ground, it should preferably be made of a very hard material, such as hardened steel.

Located immediately behind the shovel 14 is a seed tube 16 which directs seed from a suitable hopper (not shown in FIGS. 1 and 2) into the furrow cut by the apparatus. The seed tube is positioned in such a manner that its outlet 17 is located immediately above the shoe member 13 intermediate its forward and rearward ends. Seed emerging from the outlet 17 consequently falls on one side or the other of the shoe member 13 in a manner explained in greater detail later. It is to be noted that the shovel 14 surrounds the outlet 17 at the front and thus prevents the outlet from becoming blocked by soil.

The seed tube 16 is rigidly held in place by means of a frame member 18 extending upwardly from the shoe member 13, to which the seed tube is attached by means of bolt 19 and nut 20. Moreover, the seed tube is also held at the front by a semi-cylindrical clip 21 attached to the soil point 12 by the connecting piece 15.

A fertilizer tube 22 is attached (e.g. by welding) at the rearward end of the shoe member 13. This is preferably a stiff metal tube and a flexible tube or hose 23 may be attached to its upper end, e.g. by a clamp 24. The flexible tube 23 may be connected to a hopper (not shown) for fertilizer which is fed to an outlet 25 at the lower end of fertilizer tube 22. It will be noticed that the outlet 25 is cut obliquely across tube 22. This makes the outlet less likely to become blocked by soil.

The relative vertical positions of the various parts of the apparatus are important as explained in the following. The lower edge 26 of the shoe member 13 must be located a considerable distance below the lower edge 27 of the shovel 14. This separation is indicated by the distance A shown at the right hand side of FIG. 1. The lower edge 28 of the soil point 12 should preferably, but not necessarily, be located a short distance below the lower edge of the shoe member 13. This separation is indicated by the distance B shown at the right hand side of FIG. 1. Naturally, the lower edge 27 of the shovel 14 must be located below the soil surface 11, this separation being indicated by distance C. As noted above, the outlet 17 of the seed tube must be located above the upper edge 29 of the shoe member and the outlet 24 of the fertilizer tube should preferably be located below the lower edge 27 of the shovel 14. The reasons for these relative positions is shown in FIGS. 3 to 7 which represent transverse vertical cross-sections of the soil at various points along the apparatus.

FIG. 3 is a section on the line III—III of FIG. 1 and shows the soil point 12 cutting a narrow slot-like furrow 30 through the soil 31. FIG. 4 is a section on the line IV—IV of FIG. 1 and shows how the shovel 14 superimposes a relatively wide furrow 32 on the upper end of narrow furrow 30. FIG. 5 is a cross-section on the line V—V of FIG. 1 and shows how seeds 33 pass through seed tube 16, emerge from its outlet 17 and are divided by the shoe member 13 so that some fall on one side of the member and others fall on the other side In both cases, the seeds come to rest on the bottom 34 surfaces of the wide furrow 32. The seeds cannot fall into the narrow furrow 30 because this is occupied by the shoe member 13. FIG. 6 is a cross-section on line VI—VI of FIG. 1. At this point, the narrow furrow 30 is no longer occupied by shoe member 13 but the seeds 33 have by now lost their momentum and rest securely on the surfaces 34 at the bottom of the wide furrow. Fertilizer 35 from fertilizer tube 22 then passes into the narrow furrow below the level of the seeds 33.

At this stage, additional apparatus may be provided to fill in the furrows with soil or, if the soil is loose, the furrow may fill itself naturally and cover the seeds and fertilizer. When equipment is provided to fill the furrow, any suitable conventional equipment may be employed, e.g. a scraper or a roller.

FIG. 7 shows the relative positions of the seeds 33 and fertilizer 35 after the combined planting and fertilizing operation is complete The fertilizer is located below the seeds and is separated from the seeds by a thin layer of soil. As the seeds germinate, the emerging roots eventually encounter the fertilizer but damage to the seeds is avoided because they do not come into direct contact with the fertilizer.

Incidentally, the lower edge 28 of the soil point 12 is located below the lower edge 26 of the shoe member 13 in order to allow for wear of the soil point. As the material wears, edge 28 gradually approaches edge 26. When the two edges coincide, the soil point 12 or the entire apparatus should be replaced.

Just as the outlet 17 of the seed tube 16 is protected by the shovel 14, the outlet 25 of fertilizer tube 22 is protected from blockage by soil by shoe member 13. Consequently, the apparatus is reliable, even when used in moist or clay soils.

Moreover, it will be noticed that both the narrow furrow and the wide furrow are cut ahead of the points where the seed and the fertilizer are introduced into the soil, so that the cutting of the furrows does not disturb the seed or fertilizer in any way. The fact that the shoe member occupies the narrow furrow for a considerable distance behind the shovel 14 means that not only seeds are prevented from falling into the narrow furrow but also any loose soil which may slide back once the shovel 14 has passed. The narrow furrow is thus kept clear for the fertilizer. If loose soil does fall back immediately after the shovel has passed, it is likely to cover the seeds 33 and thus make it even less likely that the seeds will eventually come into contact with the fertilizer 35.

Figure 8:
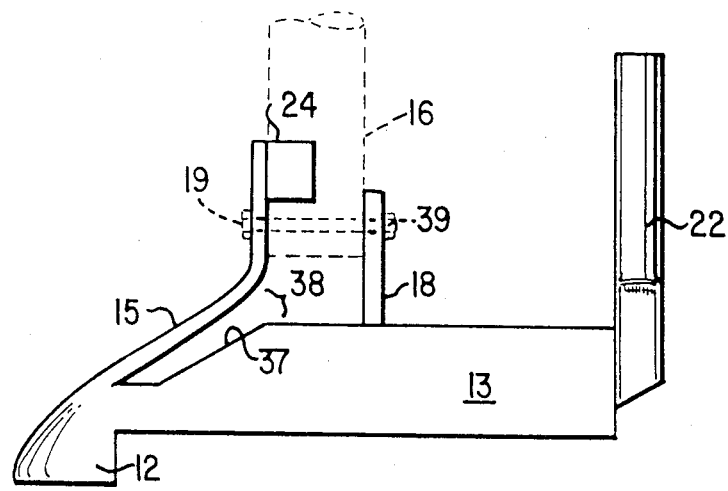
FIG. 8 is a side elevation of an attachment which may be part of the apparatus of FIG. 1.
Figure 9:
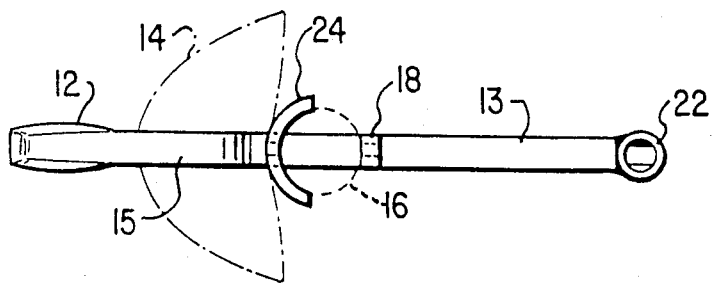
FIG. 9 is a top plan view of the attachment of FIG. 8.

FIGS. 8 and 9 show an attachment for a seed drill used to form the apparatus of the invention. Seed drills having a seed delivery tube such as the one shown at 16 in FIGS. 1 and 2 and a shovel such as 14 are known, so seed drills of this kind can be easily and economically converted to combined seed planting and fertilizing apparatus of the invention by means of the attachment as shown.

The attachment consists of all of the elements previously described except for the seed tube and shovel. The forward end of the shoe element 13 has a sloping edge 37 which, together with the connecting piece 15 defines a slot 38 for receiving the shovel 14 (shown in broken lines in FIG. 9). The frame member 18 is welded to the top edge of the shoe member 13 in a position where it will abut against the rear surface of the seed tube 16 (see FIG. 9). The frame member 18 has a hole 39 for receiving a bolt such as 19 shown in FIG. 1 so that the attachment can be securely fixed to the seed tube. The front of the seed tube is also gripped by clamp 24.

Figure 2:
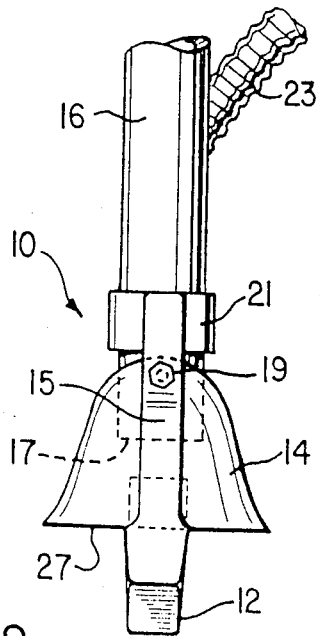
FIG. 2 is a front view of the apparatus of FIG. 1.

Accordingly, the apparatus of the invention can be produced and sold as a complete unit as shown in FIGS. 1 and 2, or an attachment as shown in FIGS. 8 and 9 may be produced and sold for converting existing seed drills. The attachment can be manufactured in a variety of forms to match existing seed drills, i.e. the dimensions and relative positions of the various elements may have to be different according to the minor differences of existing seed drills, but the attachment will function in essentially the same way in each case. Moreover, the attachment can be modified for use also with hoe drills and air seeders.

Figure 10:
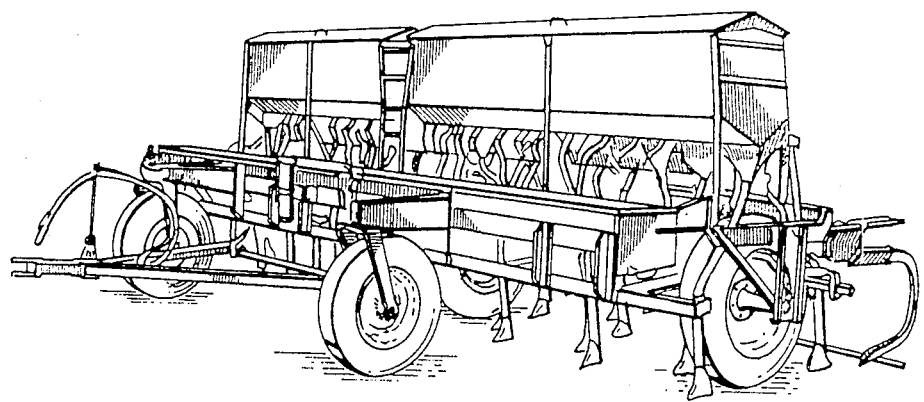
FIG. 10 is a perspective view of a conventional seed drill machine to which the attachment of FIGS. 8 and 9 may be fixed.

FIG. 10 shows a conventional seeder of a type which may be modified by the use of attachments as shown in FIGS. 8 and 9. A separate attachment may be fixed to each of the seed tubes 16 and a hopper for fertilizer (not shown) would be provided.

The apparatus of the invention may extend a few inches (e.g. up to about 9") into the top soil and the spacing between the bottom of the fertilizer furrow and the bottom of the seed furrow (i.e. space A+B in FIG. 1) may be about ½ to 2 inches.

The apparatus may be used with gravity feed seeders or air seeders and the fertilizer may be a particulate solid, a liquid or a gas (e.g. anhydrous ammonia).

Although a preferred embodiment of the invention has been described in detail above, it will be apparent to persons skilled in this art that various modifications and alterations may be made without departing from the scope of the invention as defined by the following claims. All such modifications and alterations form part of this invention.

I claim:

1. A fertilizer attachment for a seed drill provided with furrow opening means and a seed delivery tube having an outlet behind said furrow opening means, said attachment comprising:

an additional rearwardly sloping furrow opening means of narrower width than said furrow opening means of the seed drill for opening a narrow slot-like opening in soil, said additional furrow opening means having a lower end;

a narrow upright plate-like shoe member having forward and rearward ends, said shoe member being at least as wide as said additional furrow opening means, and said shoe member being located immediately behind said additional furrow opening means;

a fertilizer delivery tube having an outlet located immediately behind the rearward end of the shoe member; and attachment means for attaching said attachment to said seed drill such that said attachment is capable of being attached with: said additional furrow opening means extending forward of, and in alignment with, said furrow opening means of the seed drill with said lower end of said additional furrow opening means extending below the furrow opening means of the seed drill, and said shoe member extending below the outlet of the seed delivery tube with said seed delivery outlet located between the forward and rearward ends of the shoe member.

2. Apparatus for the combined planting of seed and application of fertilizer, which comprises:

first furrow opening means for opening a narrow slot-like furrow in soil, said first furrow opening means having a lower end, an upper end spaced above said lower end and a leading edge interconnecting said lower and upper ends, said leading edge sloping rearwardly from the lower end to the upper end relative to an intended direction of travel of the first means through the soil;

a second furrow opening means located behind said first means in alignment therewith but having greater lateral width than the first means and extending by a substantially equal distance on each side of said first means, said second means being located above said lower end of said first means, said second means opening a furrow that is wider than said narrow slot-like furrow and is superimposed thereon to form a single combined furrow having a narrow bottom portion, a wider top portion and substantially horizontal portions between the top and bottom portions on each side of the combined furrow;

a narrow upright plate-like shoe member, said shoe member being at least as wide as said first furrow opening means and having forward and rearward end, said shoe member located immediately behind said first means to prevent soil from falling back into said narrow slot-like furrow;

a seed delivery tube having an outlet located behind said second means and above said shoe member between said forward and rearward ends of said shoe member and positioned so that seed passing through said outlet may fall randomly on both said substantially horizontal portions of the combined furrow on opposite sides of said shoe member; and a fertilizer delivery tube having an outlet located immediately behind said rearward end of said shoe member in alignment with said narrow bottom portion of the combined furrow.

3. Apparatus according to claim 2 wherein the first furrow opening means has a vertical extent, and said shoe member has a vertical extent, the vertical extent of the first furrow means extending into the soil to a depth exceeding that of said shoe member.

4. Apparatus according to claim 2 wherein said first furrow opening means is defined as a wedge-shaped member at said lower end.

5. Apparatus according to claim 2 wherein said first furrow opening means comprises a wedge-shaped member at said lower end having a narrow bar extending upwardly and rearwardly therefrom, said narrow bar defining said leading edge.

6. Apparatus according to claim 2 wherein said first furrow opening means is made of hardened steel.

7. Apparatus according to claim 2 wherein said fertilizer delivery tube has a lower end defining said outlet of said fertilizer delivery tube, and wherein said lower end is inclined upwardly away from said shoe member.

8. Apparatus according to claim 2 wherein the fertilizer delivery tube is attached to said shoe member.

9. Apparatus according to claim 2 wherein said second furrow opening means is a plough-like member attached to the lower end of the seed delivery tube and extending into a sloping slot formed at said forward end of the shoe member.

* * * * *